(12) United States Patent
Rölleke et al.

(10) Patent No.: US 12,140,198 B2
(45) Date of Patent: Nov. 12, 2024

(54) VIBRATION DAMPER HAVING A HYDRAULIC COMPRESSION STOP

(71) Applicant: ZF FRIEDRICHSHAFEN AG, Friedrichshafen (DE)

(72) Inventors: Hartmut Rölleke, Kircheib (DE); Johannes Gessner, Euerbach (DE); Alexander Au, Windeck (DE); Cigdem Aladag Mutlu, Gebze (TR); Tayfun Tunc, Gebze (TR)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 368 days.

(21) Appl. No.: 17/724,169

(22) Filed: Apr. 19, 2022

(65) Prior Publication Data

US 2022/0333663 A1 Oct. 20, 2022

(30) Foreign Application Priority Data

Apr. 20, 2021 (DE) ...................... 10 2021 203 895.6

(51) Int. Cl.
*F16F 9/49* (2006.01)
*F16F 9/32* (2006.01)

(52) U.S. Cl.
CPC .......... *F16F 9/3242* (2013.01); *F16F 9/3271* (2013.01); *F16F 9/49* (2013.01)

(58) Field of Classification Search
CPC ........... F16F 9/3242; F16F 9/3271; F16F 9/49
See application file for complete search history.

(56) References Cited

U.S. PATENT DOCUMENTS

| | | | | |
|---|---|---|---|---|
| 10,527,122 B2* | 1/2020 | Kus | .......................... | F16F 9/49 |
| 10,670,107 B2* | 6/2020 | Flacht | .................... | F16F 9/3465 |
| 10,746,252 B2* | 8/2020 | Flacht | ........................ | F16F 9/34 |
| 10,876,591 B2* | 12/2020 | Mallin | .................. | F16F 9/5126 |
| 11,131,362 B2* | 9/2021 | Flacht | .................... | F16F 9/3465 |
| 11,187,298 B2* | 11/2021 | Mallin | ...................... | F16F 9/49 |
| 11,320,017 B2* | 5/2022 | Bielak | ...................... | F16F 9/585 |
| 11,473,645 B2* | 10/2022 | Conti | ....................... | F16F 9/504 |
| 11,543,000 B2* | 1/2023 | Kontny | ...................... | F16F 9/49 |
| 11,668,367 B2* | 6/2023 | Kasprzyk | ................ | F16F 9/185 |
| | | | | 188/284 |

(Continued)

FOREIGN PATENT DOCUMENTS

DE    10 2019 206 510    11/2020

OTHER PUBLICATIONS

Office Action issued on Jan. 5, 2022 in corresponding DE Application No. 10 2021 203 895.6.

*Primary Examiner* — Thomas W Irvin
(74) *Attorney, Agent, or Firm* — Cozen O'Connor

(57) ABSTRACT

A vibration damper having a hydraulic compression stop includes: a cylinder filled with a damping medium; a piston rod guided in the cylinder the cylinder having a first piston fastened to the piston rod and slidable on an inner wall of the cylinder; and a second piston arranged on the piston rod at an axial distance from the first piston the second piston being slidable in a pressure cylinder. The pressure cylinder is formed with respect to the cylinder by a separate plastic pressure sleeve having a bottom, and the bottom of the pressure sleeve and a coating surface of the base on a side of the base facing away from the pressure sleeve are connected to each other via at least one web.

7 Claims, 4 Drawing Sheets

(56) References Cited

U.S. PATENT DOCUMENTS

| | | | | |
|---|---|---|---|---|
| 11,835,108 | B2* | 12/2023 | Kasprzyk | F16F 9/49 |
| 2013/0192457 | A1* | 8/2013 | Ashiba | F16F 9/3484 |
| | | | | 92/169.1 |
| 2018/0223942 | A1* | 8/2018 | Kus | F16F 9/165 |
| 2019/0162266 | A1* | 5/2019 | Flacht | F16F 9/18 |
| 2019/0186584 | A1* | 6/2019 | Flacht | F16F 9/165 |
| 2020/0256420 | A1* | 8/2020 | Mallin | F16F 9/49 |
| 2021/0054901 | A1* | 2/2021 | Gross | F16F 9/18 |
| 2021/0131519 | A1* | 5/2021 | Mallin | F16F 9/185 |
| 2021/0207678 | A1* | 7/2021 | Bielak, II | F16F 9/34 |
| 2021/0404528 | A1* | 12/2021 | Kasprzyk | F16F 9/185 |
| 2022/0333664 | A1* | 10/2022 | Kasprzyk | F16F 9/49 |

\* cited by examiner

VIBRATION DAMPER HAVING A HYDRAULIC COMPRESSION STOP

BACKGROUND OF THE INVENTION

1. Field of the Invention

The invention relates to a vibration damper having a hydraulic compression stop.

2. Description of the Related Art

DE 10 2019 206 510 A1 discloses a vibration damper having a hydraulic compression stop, the pressure cylinder of which vibration damper comprises a pressure sleeve and a base carrying the pressure sleeve. In the embodiment according to its FIG. 9, the pressure sleeve comprises an outer metallic sleeve with a cylinder insert made from plastic. The bottom of the pressure cylinder is formed by the cylinder insert and a supporting bottom of the base. Both bottoms are configured as flat bottoms which are formed over the full surface area parallel to the base area of the pressure cylinder.

The pressure sleeve and the base are connected nonreleasably to each other via a central rivet element which penetrates both the bottom of the cylinder insert and the supporting bottom.

U.S. Pat. No. 10,527,122 B2 likewise relates to a vibration damper having a hydraulic compression stop. In this design, use is made of a pressure sleeve which is completely manufactured from plastic and is connected to a metallic base via a bayonet thread. Both the bottom of the pressure sleeve and the supporting bottom of the base are configured as flat surfaces. This constructional form is significantly more complicated to produce because of the bayonet thread than the construction according to DE 10 2019 206 510.

SUMMARY OF THE INVENTION

It is an object of the present invention to simplify a vibration damper having a hydraulic compression stop in respect of the structural design.

This object may be achieved in that the pressure sleeve has, in the direction of the base, an encircling centering ring which positions the pressure sleeve with respect to the base, and the bottom of the base is coated on its top sides with plastic, wherein the bottom of the pressure sleeve and a coating surface of the base on the side of the base facing away from the pressure sleeve are connected to each other via at least one web.

This therefore provides a highly pressure-stable pressure cylinder, in which the connection between the pressure sleeve and the base is very simply closed by the plastic injection-moulding process for the pressure sleeve. No further working step is therefore necessary for the connection.

In a further advantageous refinement, the base has at least one step, wherein an outer lateral surface of the pressure sleeve extends as far as a radial supporting surface of the step. The supporting surface therefore represents an axially defined end of the coated surfaces on the base.

According to an advantageous aspect, at least one connecting opening between the outer lateral surface of the pressure sleeve and an inner side of the base is formed within the step. The damping medium displaced by the piston rod and flows around the pressure sleeve can flow away in the direction of a bottom valve via generously dimensioned connecting openings.

So that the damping medium can flow out of the working space remote from the piston rod in an unconstricted manner as possible, the outer side of the centering ring forms at least one portion of an encircling collecting groove which connects the outer lateral surface of the pressure sleeve to a number of connecting openings in the base.

In respect of an optimum use of construction space, a base area of the collecting groove is formed obliquely with respect to the longitudinal axis of the pressure sleeve.

Preferably, a supporting ring of the base, the supporting ring carrying the pressure sleeve, has a conical shape in the direction of the bottom of the pressure sleeve. As a result, the base is generally speaking stiffening and the forming outlay on the base for forming the connection between the bottom and the supporting ring is optimized.

The bottom of the base is preferably in the form of a depression in order to introduce force uniformly to the base.

One measure for increasing the durability of the pressure cylinder consists in that the coating surface on the base is formed with a rib profile.

To optimize the flow paths, the supporting ribs run radially between the connecting openings of the base. No complicated closed channels are therefore necessary.

For a simple implementation of the plastic injection-moulding process, the bottom of the base has an orientation lug via which the base is aligned with respect to the pressure sleeve. The base is therefore guaranteed to be aligned in the circumferential direction within the injection mould in such a manner that mould slides which are intended to engage in the connecting openings of the base are positioned so as to always match the connecting openings.

In respect of an optimum axial bracing of the cylinder and of the base within the vibration damper, the base for the cylinder has an annular contact surface which is free from a plastics coating.

During the assembly of the vibration damper, the pressure cylinder is introduced together with the cylinder into an outer container tube. For this purpose, it is helpful if the lateral surface of the pressure sleeve has a radially offset clamping surface which forms a press fit with the cylinder. The pressure cylinder therefore cannot fall out of the cylinder, which is open on the end side, during the assembly.

Other objects and features of the present invention will become apparent from the following detailed description considered in conjunction with the accompanying drawings. It is to be understood, however, that the drawings are configured solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained in more detail with reference to the following description of the figures, in which.

DETAILED DESCRIPTION OF THE PRESENTLY PREFERRED EMBODIMENTS

Figure 1:
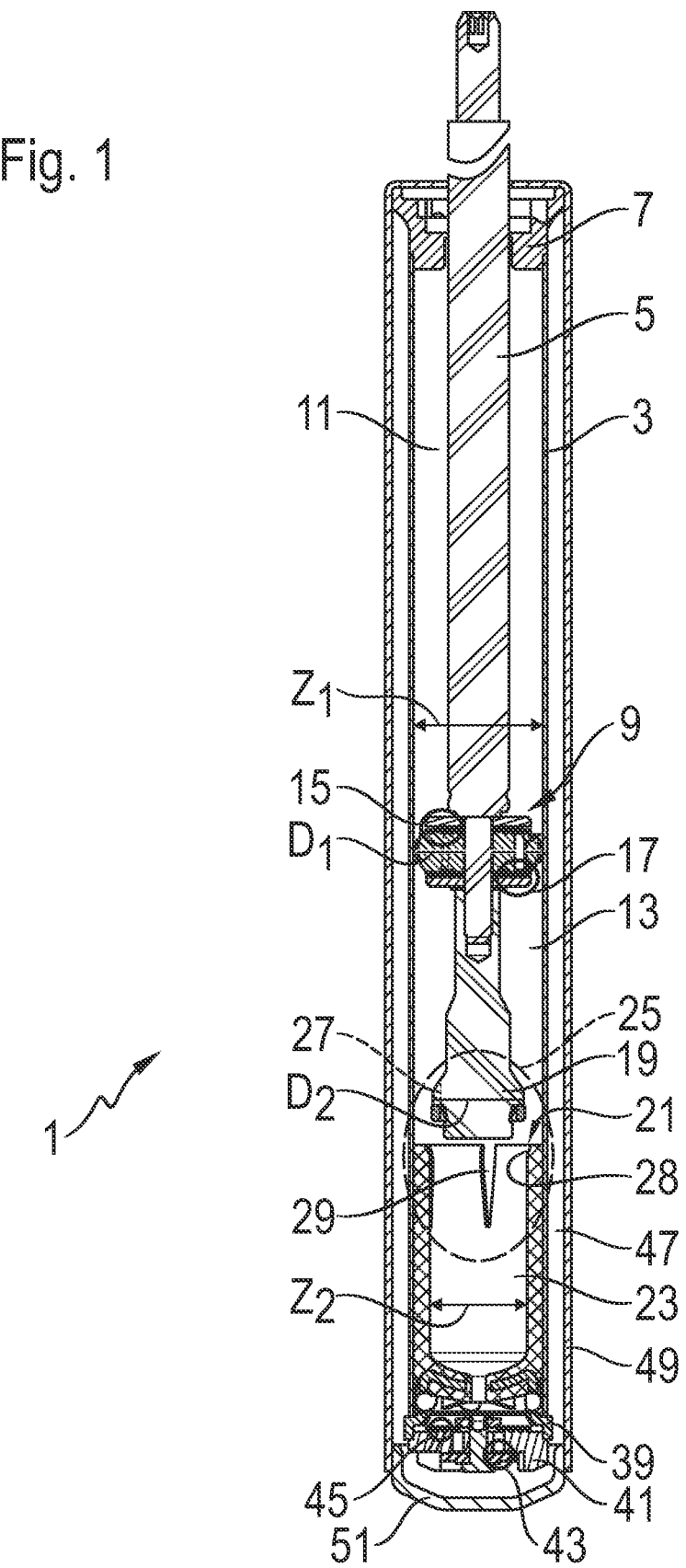
FIG. 1 shows a longitudinal section through a vibration damper having a hydraulic compression stop.

The vibration damper 1 comprises a cylinder 3 which is completely filled with a damping medium and in which a piston rod 5 is guided in an axially movable manner. A piston rod guide 7 closes one end of the cylinder 3. Fastened to the piston rod 5 is a first piston 9, the nominal diameter $D_1$ of which is adapted to the inside diameter $Z_1$ of the cylinder 3 and which divides the cylinder 3 into a working space 11 on the piston-rod side and a working space 11; 13 on the side remote from the piston rod. The first piston 9 has a damping valve 15 which produces a damping force during a retraction movement, and a damping valve 17 which produces a damping force during an extension movement of the piston rod 5.

Furthermore, a second piston 19 is fastened to the piston rod 5, the second piston protruding, depending on the stroke, into a pressure cylinder 21 having a pressure space 23 as a component of a hydraulic compression stop 25. The second component of the hydraulic compression stop 25 is formed by the second piston 19. The second piston 19 has at least one throttle opening 27 through which the damping medium, which has been displaced out of the pressure space 23 by the second piston 19, can flow into the working space 13 on the side remote from the piston rod. In order to avoid extreme jumps in damping force during the retraction of the second piston 19 into the pressure cylinder 21, the pressure cylinder 21 has at least one conical widened portion in the form of an inlet slope 28 which can also be formed in combination with at least one throttle groove 29. The pressure cylinder 21 is a separate component with respect to the cylinder 3 and has an inside diameter $Z_2$ which is smaller than the inside diameter $Z_1$ of the cylinder 3. Consequently, the second piston 19 also has a smaller nominal diameter $D_2$ than the first piston 9.

Figure 2:
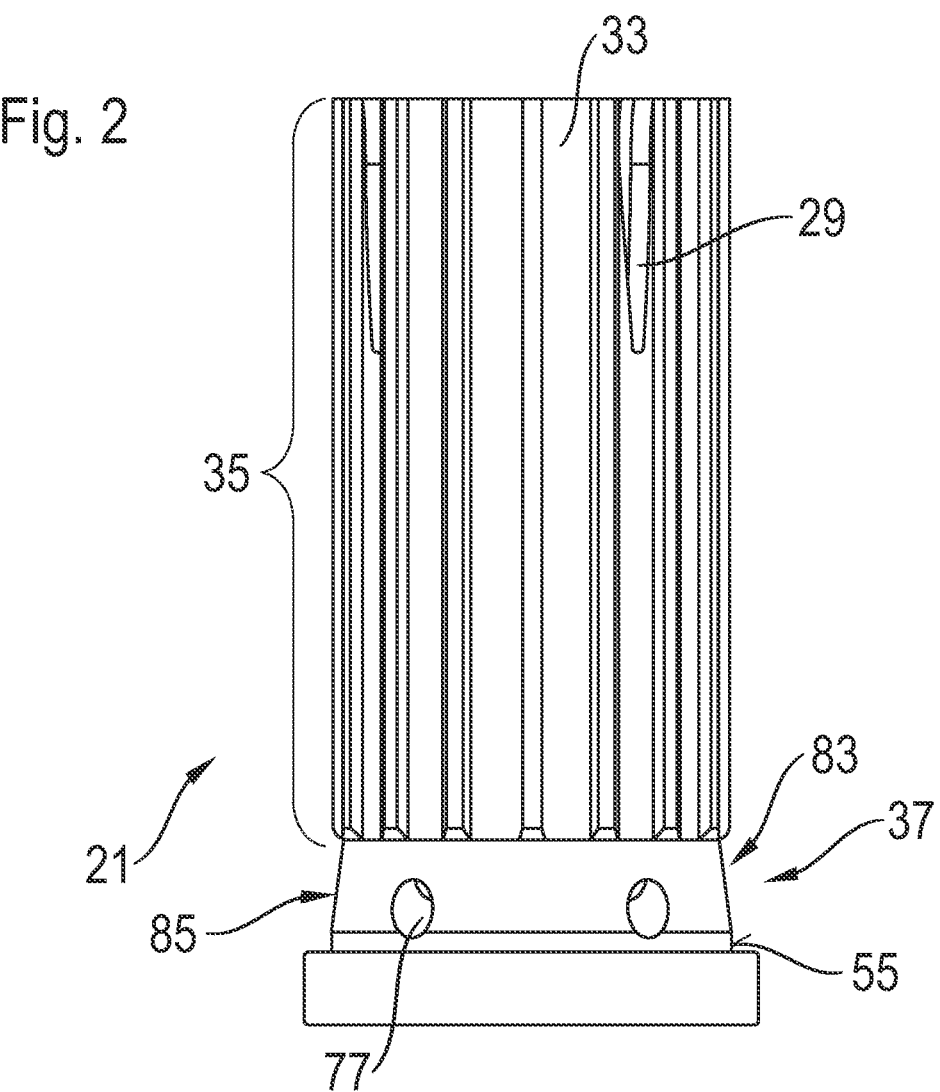
FIG. 2 shows an outer view of the pressure cylinder according to FIG. 2.

As FIG. 2 shows, the pressure cylinder 21 has, on an outer lateral surface 31, axially running grooves 33 which are connected hydraulically in parallel to the pressure space 23 of the pressure cylinder 21.

Figure 3:
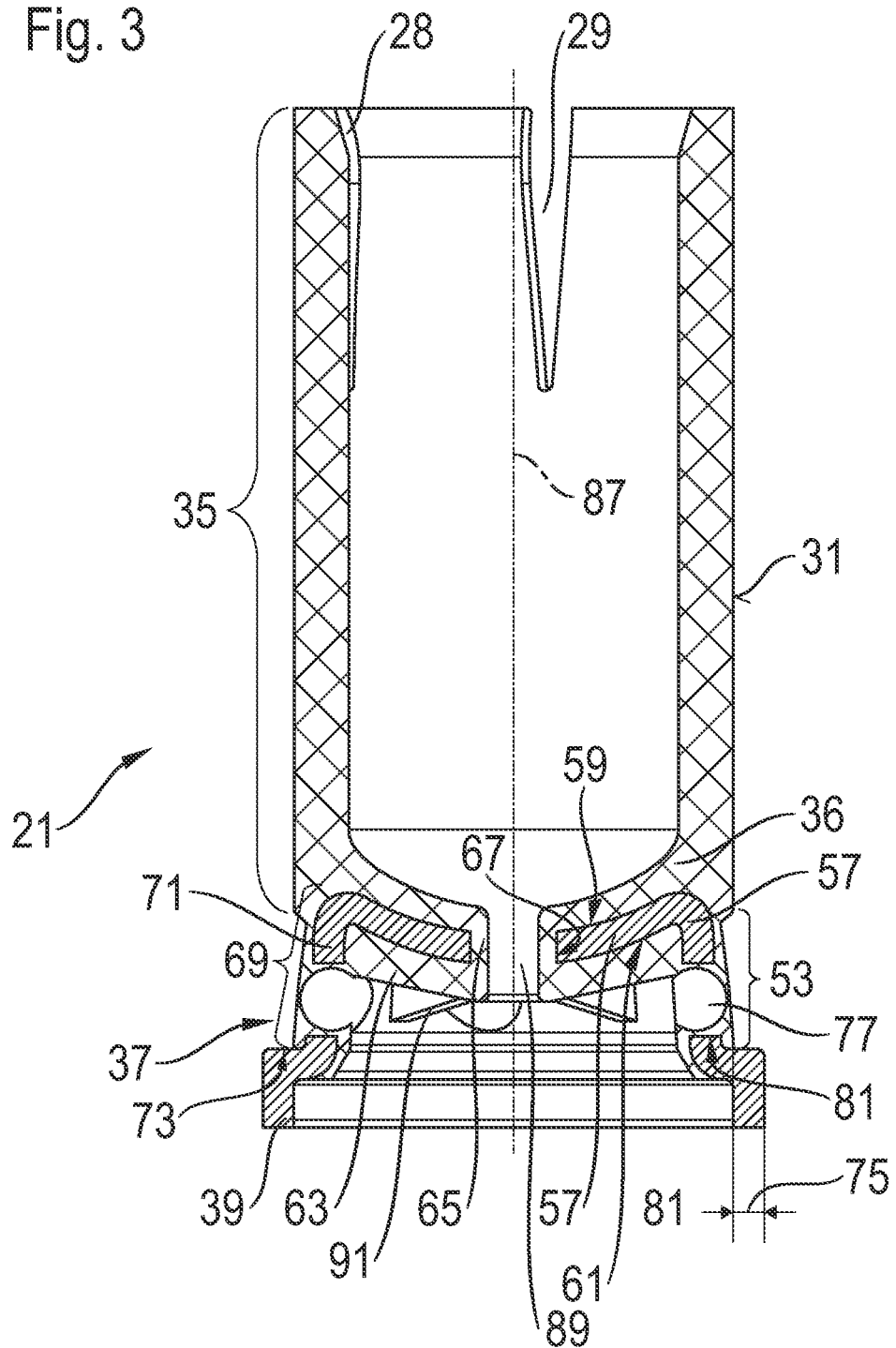
FIGS. 3 and 4 show sectional illustrations of the pressure cylinder in different sectional planes.
Figure 4:
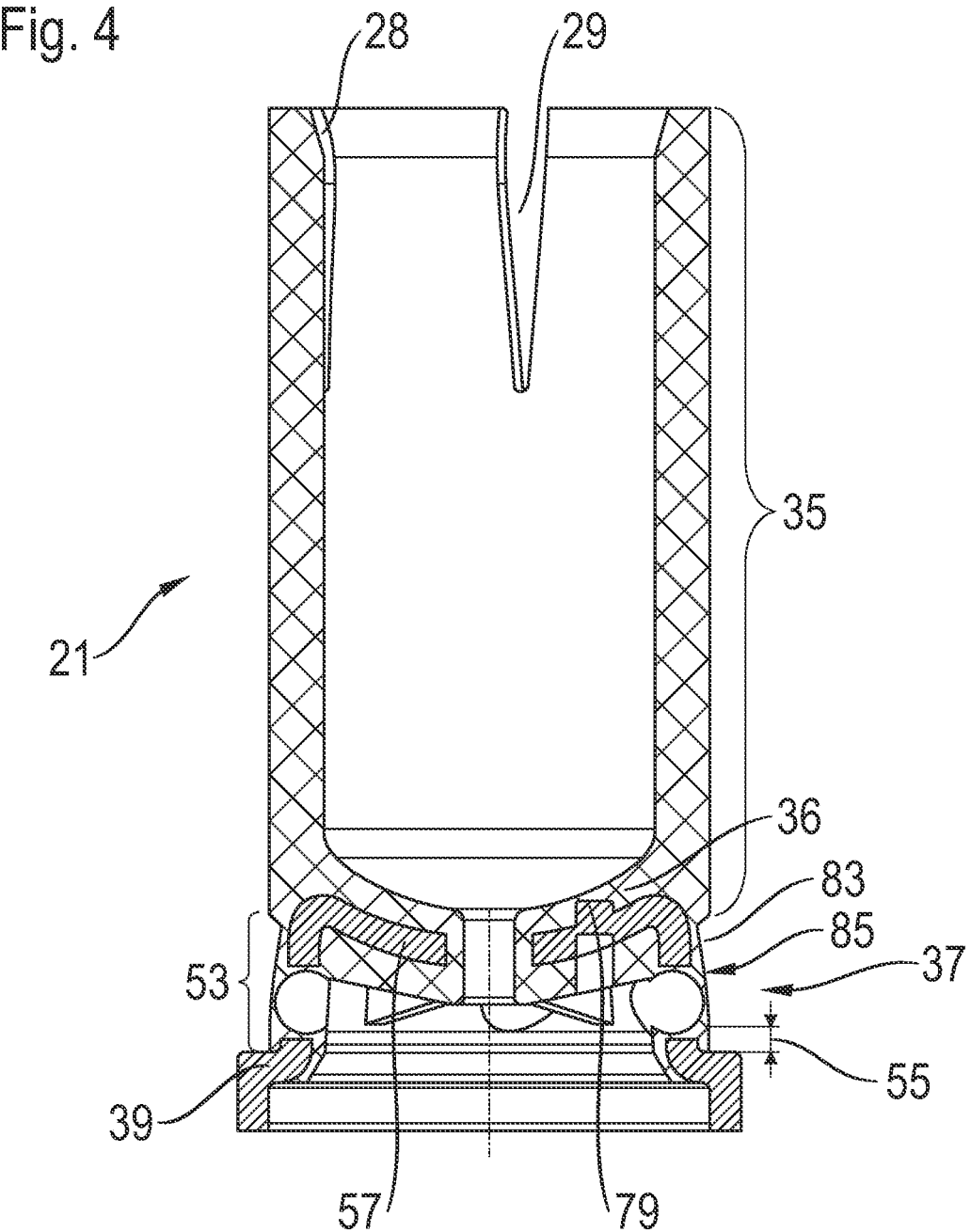

As in particular FIGS. 3 and 4 show, the pressure cylinder 21 has a pressure sleeve 35 with a bottom 36, the pressure cylinder 21 being supported on a base 37. The base 37 in turn stands with its annular web 39 on a bottom valve body 41, which delimits the cylinder 3 on the end side in the retraction direction of the piston rod 5.

The bottom valve body 41 comprises a damping valve 43 which becomes effective in the event of an incident flow from the working space 13 on the side remote from the piston rod and, in the process, allows the volume which has been displaced by the piston rod 5 to pass. In addition, the bottom valve body 41 has a nonreturn valve 45 which opens during a flow starting from an equalizing space 47 into the working space 13 on the side remote from the piston rod and, in the process, does not produce any significant damping force. The equalizing space 47 is delimited by a container tube 49 which encases the cylinder 3 and which, together with an outer wall of the cylinder 3, forms an annular space which is partially filled with damping medium and partially with a gas. The bottom valve body 41 is supported on a bottom 51 of the container tube 49. The bottom 51 of the container tube 49, the container tube 49 and the piston rod guide 7 form a bracing chain for the cylinder 3, the base 37 and the bottom valve body 41 since the cylinder 3 is supported axially on the annular web 39 of the base 37. The base 37 is therefore fixed axially in both directions.

During a deflection movement of the piston rod 5 within a certain order of magnitude, only the first piston 9 or the damping valve 15 is active for the retraction direction. The second piston 19 is then always located axially outside the pressure cylinder 21. Should this comfort region be left, the second piston 19 then retracts into the pressure cylinder 21, as a result of which the volume of the pressure space 23 is reduced and damping medium is forced out of the pressure space 23 via the throttle opening 27 into the working space 13 on the side remote from the piston rod such that then both the first and the second piston 9; 19 produce a significantly greater damping force with their damping valves 15; 27 since the two damping valves 15; 27 are hydraulically connected in parallel. All of the damping medium which has been displaced by the piston rod 5 can then flow via the axially running grooves 33 in the pressure sleeve 35 out of the working space 13 on the side remote from the piston rod through the damping valve 43 into the equalizing space 47.

FIGS. 3 and 4 show the pressure cylinder 21 in different sectional planes. It can be seen that the pressure cylinder 21 has a pressure sleeve 35 which is completely composed of a plastic. In the direction of the base 37, which is composed of a metallic material, the pressure sleeve 35 of the pressure cylinder 21 has an encircling centering ring 53 which positions the pressure sleeve 35 with respect to the base 37. The outer lateral surface 31 of the pressure sleeve 35, in this case the centering ring 53, in turn has a radially offset clamping surface 55 which forms a press fit with the cylinder 3.

A bottom 57 of the base 37 is coated on its top sides 59; 61 with plastic. The bottom 36 of the pressure sleeve 35, the bottom also delimiting the pressure chamber 23 on the end side, and a coating surface 63 of the base 37 on the side of the base 37 facing away from the pressure sleeve 35 are connected to each other via at least one web 65. The bottom 57 of the base 37 has a through opening 67 for this purpose. The bottom 57 of the base 37 is therefore a reinforcement of the entire bottom 36 of the pressure cylinder 21. In principle, a plurality of connecting webs 65 can also be provided. In this embodiment, the web is configured as a central bolt-shaped web. However, one or more eccentric webs 65 can also be provided in particular if required by the construction space situation.

The base 37 has at least one step 69 which connects the bottom 57 of the base 37, which is in the form of a depression, to the annular web 39 sitting on the bottom valve body 41. A supporting ring 71 of the base 37, the supporting ring carrying the pressure sleeve 35, has a conical shape in the direction of the bottom 36 of the pressure sleeve 35. A slightly obliquely positioned step shape is therefore produced on the base 37. The outer lateral surface 31 of the pressure sleeve 35 extends as far as a radial supporting surface 73 of the step. The supporting surface 73 not only forms an axial end for the pressure sleeve 35 but additionally has an annular contact surface 75 for the cylinder 3, the contact surface being free from a plastics coating.

Within the step 69 of the base 37, at least one connecting opening 77 is formed between the outer lateral surface of the pressure sleeve 35 and an inner side of the base 37. These connecting openings 77 transport the damping medium volume, which flows via the axial grooves 33 of the pressure sleeve 35, between the working space 13 on the side remote from the piston rod and the damping valve 43. The inlet and outlet cross sections of the connecting openings 77 are surrounded by the plastic of the pressure sleeve 35. For the simple and reliably functioning production of the pressure sleeve 35, the bottom 57 of the base 37 has an orientation lug 79 via which the base 37 is aligned with respect to the pressure sleeve 35 and therefore within an injection mould, not illustrated. The mould slides of the injection mould that ensure that the connecting openings 77 remain free can enter recesses 81 of the base 37 without resistance.

The outer side of the centering ring 53 as the axial end of the pressure sleeve 35 forms at least one portion of an encircling collecting groove 83, which connects the outer lateral surface 31 of the pressure sleeve 35 and therefore the axial grooves 33 in the pressure sleeve 35 to the connecting openings 77 in the base 37.

A base area 85 of the collecting groove 83 is formed obliquely with respect to the longitudinal axis 87 of the pressure sleeve 35 such that a collecting groove 83 of maximum depth is available.

Figure 5:
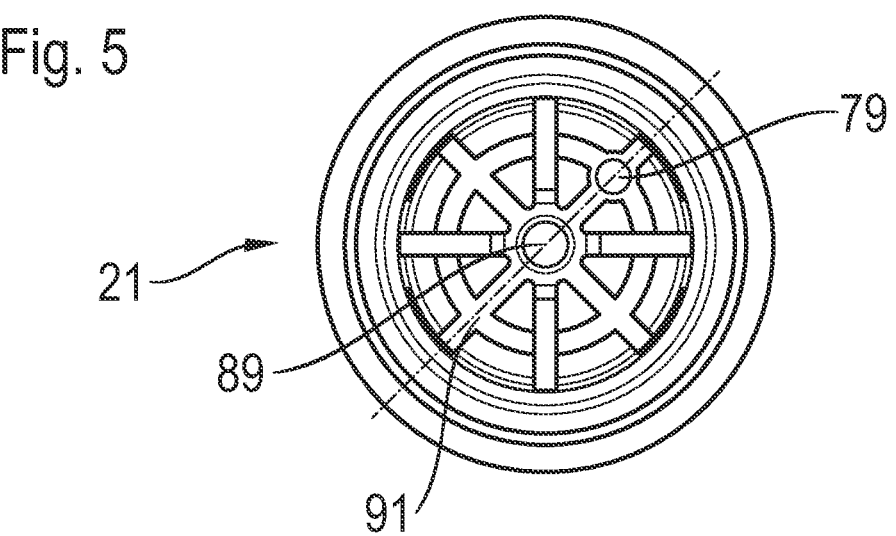
FIG. 5 shows a view from below of the pressure cylinder according to FIG. 2.

In the overall view of FIGS. 3 to 5, it can be seen that, except for a central functional opening 89 in the bottom of the pressure cylinder 37, the entire bottom 57 of the base 37 is provided with the coating surface 63. The coating also extends radially on the inner side of the supporting ring 71 of the base 37 into the rear-side region of the supporting surface 73. Furthermore, the coating surface 63 on the base 37 is formed with a rib profile, wherein supporting ribs 91 run radially between the connecting openings 77 of the base 37.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE SIGNS

1 Vibration damper
3 Cylinder
5 Piston rod
7 Piston rod guide
9 First piston
11 Working space on the piston-rod side
13 Working space on the side remote from the piston rod
15 Damping valve
17 Damping valve
19 Second piston
21 Pressure cylinder
23 Pressure space
25 Hydraulic compression stop
27 Throttle opening
28 Conical widened portion
29 Throttle groove
31 Outer lateral surface of the pressure cylinder
33 Axial groove
35 Pressure sleeve
36 Bottom of the pressure sleeve
37 Base
39 Annular web
41 Bottom valve body
43 Damping valve
45 Nonreturn valve
47 Equalizing space
49 Container tube
51 Bottom of the container tube
53 Centering ring
55 Clamping surface
57 Bottom of the base
59 Top side of the base
61 Top side of the base
63 Coating surface
65 Web
67 Through opening
69 Step
71 Supporting ring
73 Supporting surface
75 Contact surface
77 Connecting opening
79 Orientation lug
81 Recesses
83 Collecting groove
85 Base area
87 Longitudinal axis of the pressure sleeve
89 Functional opening
91 Supporting rib

We claim:

1. A vibration damper (1) having a hydraulic compression stop (25), comprising:
a cylinder (3) filled with a damping medium;
a piston rod (5) guided in the cylinder (3) in an axially movable manner, wherein the cylinder (3) has therewithin a first piston (9) fastened to the piston rod (5) and slidable on an inner wall of the cylinder (3);
a second piston (19) arranged on the piston rod (5) at an axial distance from the first piston (9), the second piston (19) having a diameter smaller than that of the first piston (9), and being slidable in a pressure cylinder (21) depending on a stroke position of the piston rod (5),
wherein the pressure cylinder (21) is formed with respect to the cylinder (3) by a separate plastic pressure sleeve (35) having a bottom (36),
wherein the pressure cylinder (21) is supported on a metal base (37) via a holding connection, the pressure sleeve (21) having, in a direction of the base (37), an encircling centering ring (53) configured to position the pressure sleeve (35) with respect to the base (37), and a bottom (57) of the base (37) is coated on its top sides (59; 61) with plastic, and
wherein the bottom (36) of the pressure sleeve (35) and a coating surface (63) of the base (37) on a side of the base (37) facing away from the pressure sleeve (35) are connected to each other via at least one web (65),
wherein the base (37) has at least one step (69), and wherein an outer lateral surface (31) of the pressure sleeve (35) extends as far as a radial supporting surface (73) of the step (69);
at least one connecting opening (77) between the outer lateral surface (31) of the pressure sleeve (35), an inner side of the base (37) being formed within the step (69), wherein an outer side of the centering ring (53) forms at least one portion of an encircling collecting groove

(83) which connects the outer lateral surface (31) of the pressure sleeve (35) to a plurality of connecting openings (77) in the base (37);

a base area (85) of the collecting groove (83) arranged obliquely with respect to a longitudinal axis (87) of the pressure sleeve (35); and a supporting ring (71) of the base (37), the supporting ring carrying the pressure sleeve (35), and having a conical shape in a direction of the bottom (36) of the pressure sleeve (35).

2. The vibration damper according to claim 1, wherein the bottom (57) of the base (37) is in the form of a depression.

3. The vibration damper according to claim 2, wherein a surface (63) of the plastic coating on the base (37) has a rib profile.

4. The vibration damper according to claim 3, further comprising supporting ribs (91) running radially between connecting openings (77) of the base (37).

5. The vibration damper according to claim 4, wherein the bottom (57) of the base (37) has an orientation lug (79) via which the base (37) is aligned with respect to the pressure sleeve (35).

6. The vibration damper according to claim 5, wherein the base (37) for the cylinder (3) has an annular contact surface (75) which is free from a plastic coating.

7. The vibration damper according to claim 6, wherein the lateral surface (31) of the pressure sleeve (35) has a radially offset clamping surface (55) which forms a press fit with the cylinder (3).

\* \* \* \* \*